(12) United States Patent
Sexton et al.

(10) Patent No.: US 7,559,695 B2
(45) Date of Patent: Jul. 14, 2009

(54) BEARING APPARATUSES, SYSTEMS INCLUDING SAME, AND RELATED METHODS

(75) Inventors: Timothy N. Sexton, Santaquin, UT (US); Craig H. Cooley, Saratoga Springs, UT (US)

(73) Assignee: US Synthetic Corporation, Orem, UT (US)

( * ) Notice: Subject to any disclaimer, the term of this patent is extended or adjusted under 35 U.S.C. 154(b) by 271 days.

(21) Appl. No.: 11/247,717

(22) Filed: Oct. 11, 2005

(65) Prior Publication Data

US 2007/0081749 A1      Apr. 12, 2007

(51) Int. Cl.
*F16C 17/00*      (2006.01)
(52) U.S. Cl. .............................. 384/95; 384/42; 384/285; 384/907.1
(58) Field of Classification Search ................... 384/42, 384/95, 285, 420, 297, 907, 907.1, 913; 508/109
See application file for complete search history.

(56) References Cited

U.S. PATENT DOCUMENTS

| | | | |
|---|---|---|---|
| 3,961,104 A * | 6/1976 | Tanner | ...................... 427/198 |
| 4,410,054 A | 10/1983 | Nagel et al. | |
| 4,468,138 A | 8/1984 | Nagel | |
| 4,560,014 A | 12/1985 | Geczy | |
| 4,664,595 A * | 5/1987 | Tsuji et al. | ................... 384/907 |
| 4,738,322 A | 4/1988 | Hall et al. | |
| 4,756,631 A * | 7/1988 | Jones | .......................... 384/95 |
| 5,092,687 A | 3/1992 | Hall | |
| 5,364,192 A * | 11/1994 | Damm et al. | ............... 384/420 |
| 5,368,398 A | 11/1994 | Damm et al. | |
| 5,480,233 A | 1/1996 | Cunningham | |
| 5,829,881 A * | 11/1998 | Furlani et al. | ................. 384/42 |
| 5,868,502 A * | 2/1999 | Cariveau et al. | .............. 384/93 |
| 7,322,749 B2 * | 1/2008 | Konishi et al. | ................ 384/13 |

\* cited by examiner

*Primary Examiner*—Thomas R Hannon
(74) *Attorney, Agent, or Firm*—Holland & Hart, LLP

(57) ABSTRACT

Bearing apparatuses (e.g., thrust bearings and radial bearings) are disclosed. Such bearing apparatuses may comprise a rotor including a rotor surface comprising a first superhard material and a stator surface comprising a second superhard material. In one embodiment, the first superhard material may be structured differently than the second superhard material. In another embodiment, the first superhard material may exhibit an average grain size that is smaller than an average grain size of the second superhard material. Mechanical systems including such a bearing apparatus are disclosed, such as, for example, a motor for use in subterranean drilling. Methods of operating and designing bearing apparatuses are disclosed.

25 Claims, 6 Drawing Sheets

BEARING APPARATUSES, SYSTEMS INCLUDING SAME, AND RELATED METHODS

BACKGROUND

Conventional bearing apparatuses including bearing surfaces that move relative to one another are known in the art. For example, conventional, so-called "thrust bearings" and some embodiments of radial bearings include bearing surfaces that at least partially contact and move or slide relative to one another. Such bearing surfaces may include a superhard material for resisting wear during use of the bearing. In one example, diamond (e.g., polycrystalline diamond) may comprise at least one or both of the bearing surfaces.

More particularly, one application for thrust bearings is drilling equipment utilized in the subterranean drilling arts. Particularly, drilling motors have been utilized for drilling boreholes into a subterranean formation, especially for oil or gas exploration. In a typical downhole drilling motor, the motor is suspended at the lower end of a string of drill pipe comprising a series of pipe sections connected together at joints and supported from the surface. A rotary drill bit (e.g., a fixed cutter drill bit, roller cone drill bit, a reamer, etc.) may be supported below the drilling motor (via pipe sections, drill collars, or other structural members as known in the art) or may be directly connected to the downhole motor, if desired. Drilling fluid, which is commonly called drilling mud, is circulated through the pipe string and the motor to generate torque within the motor for causing the rotary drill bit to rotate. Then, the drilling fluid is returned to the surface through the annular space between the drilled borehole and the drill string and may carry the cuttings of the subterranean formation to the surface. Further, as known in the art, downhole drilling motors may include thrust bearings. More particularly, conventional downhole drilling motors include a stator that does not rotate and is connected to a housing of the motor and a rotor that rotates with the output shaft of the downhole fluid motor. In one embodiment, the stator and the rotor are each provided with a plurality of hard bearing surfaces such as diamond elements. The stator and rotor are positioned adjacent one another so that the diamond bearing surfaces of the rotor and stator contact one another.

Conventional bearing apparatuses typically include bearing surfaces that may interlock or damage one another in response to relative sliding movement between the bearing surfaces. Examples of conventional diamond thrust bearings are disclosed by U.S. Pat. Nos. 4,410,054, 4,468,138, and 5,092,687. More specifically, FIG. 1 shows a partial, enlarged, schematic view of one embodiment of conventional bearing surfaces 114 and 154 of tables 118 and 158, wherein bearing surfaces 114 and 154 are positioned adjacent (i.e., at least partially contacting) one another. As shown in FIG. 1, conventionally, tables 118 and 158 may comprise superhard grains 170 and catalyst 172 (e.g., a catalyst). Further, the average size of the superhard grains 170 of each of tables 118 and 158 may be substantially similar. Furthermore, contact between such conventional bearing surfaces may be detrimental. Explaining further, because superhard grains 170 are similarly sized, the superhard grains 170 of table 118 may at least partially interfere, interlock, or otherwise detrimentally interact with superhard grains 170 of table 158. For example, the exposed portions of superhard grains 170 of bearing surface 154 may fit at least partially in between the exposed portions of superhard grains 170 of bearing surface 114, or vice versa. Thus, such interlocking or interference between superhard grains 170 may cause damage to bearing surface 114, bearing surface 154, or both. In further detail, FIG. 2 shows three superhard grains 170, which are labeled $G_1$, $G_2$, and $G_3$ and catalyst 172 of tables 118 and 158, respectively. As shown in FIG. 2, grains $G_1$, $G_2$, and $G_3$ exhibit respective exposure distances $E_1$, $E_2$, and $E_3$, respectively. As may be appreciated, superhard grain $G_1$ may be positioned at least partially in between superhard grains $G_2$ and $G_3$ upon bearing surfaces 114 and 154 engaging one another. In addition, relative movement (e.g., along directions $T_1$ and $T_2$) may cause damage to at least one of diamond grains $G_1$, $G_2$, and $G_3$. From the foregoing discussion, it may be appreciated that conventional bearing apparatuses (e.g., a rotor and a stator) including superhard materials comprising substantially similarly-sized (e.g., an average size) superhard grains may cause undesirable damage to the bearing surfaces of such apparatuses.

Thus, it would be advantageous to provide bearing apparatuses including bearing surfaces structured to inhibit interlocking or other detrimental interactions, systems including same, and related methods.

SUMMARY

The present invention relates generally to bearing apparatuses including contacting bearing surfaces comprising superhard materials. Generally, the bearing surfaces may comprise superhard materials that are different from one another. More particularly, such bearing surfaces may be configured to inhibit interlocking between the respective topographies of each of the bearing surfaces with one another. In one embodiment, the present invention relates to bearings including polycrystalline diamond inserts or compacts defining a plurality of surfaces that move relative to one another and contact one another. Such bearing apparatuses may encompass so-called thrust bearings, radial bearings, or other bearings including bearing surfaces that more in relation to one another, without limitation.

One aspect of the instant disclosure relates to a bearing apparatus. Particularly, a bearing apparatus may comprise a rotor and at least one rotor bearing element mounted to the rotor defining a rotor bearing surface. The rotor bearing surface may comprise a first superhard material. In addition, the bearing apparatus may comprise a stator and at least one stator bearing element mounted to the stator defining a stator bearing surface. Also, the stator bearing surface may comprise a second superhard material. The present invention contemplates that the first superhard material may be structured differently than the second superhard material. For example, the first superhard material may be structured to inhibit interlocking between superhard grains of the first superhard material and superhard grains comprising the second superhard material. In another embodiment, the first superhard material may exhibit an average grain size that is smaller than an average grain size of the second superhard material. Various mechanical systems may include such a bearing apparatus. In one embodiment, a motor configured to apply a torque to a rotary drill bit may be operably coupled to a bearing apparatus configured as a thrust bearing apparatus.

Another aspect of the present invention relates to a method of operating a bearing apparatus. More particularly, a rotor bearing surface may be provided, the rotor bearing surface comprising a first superhard material. Also, a stator bearing surface may be provided, the stator bearing surface comprising a second superhard material. The average grain size of the first superhard material may be smaller than the average grain size of the second superhard material. Further, at least a portion of the rotor bearing surface may abut against at least a portion of the stator bearing surface and the rotor bearing surface may be moved relative to the stator bearing surface.

An additional method relates to a method of designing a bearing apparatus. More specifically, a rotor may be selected including at least one rotor bearing element mounted to the rotor, wherein the at least one rotor bearing element defines a rotor bearing surface. Also, a stator may be selected including at least one stator bearing element mounted to the stator, wherein the at least one stator bearing element defines a stator bearing surface. A first superhard material exhibiting an average grain size may be selected for comprising the at least one rotor bearing element and a second superhard material exhibiting an average grain size may be selected for comprising the at least one stator bearing element of the stator. Further, the first superhard material may be selected in relation to the second superhard material so that relative movement between the bearing surface of the stator and the rotor bearing surface is intended to occur without substantial interlocking to either of the stator bearing surface and the rotor bearing surface.

Features from any of the above mentioned embodiments may be used in combination with one another, without limitation. In addition, other features and advantages of the instant disclosure will become apparent to those of ordinary skill in the art through consideration of the ensuing description, the accompanying drawings, and the appended claims.

BRIEF DESCRIPTION OF THE DRAWINGS

Further features of the subject matter of the instant disclosure, its nature, and various advantages will be more apparent from the following detailed description and the accompanying drawings, which illustrate various exemplary embodiments, are representations, and are not necessarily drawn to scale, wherein.

DETAILED DESCRIPTION

Figure 1:
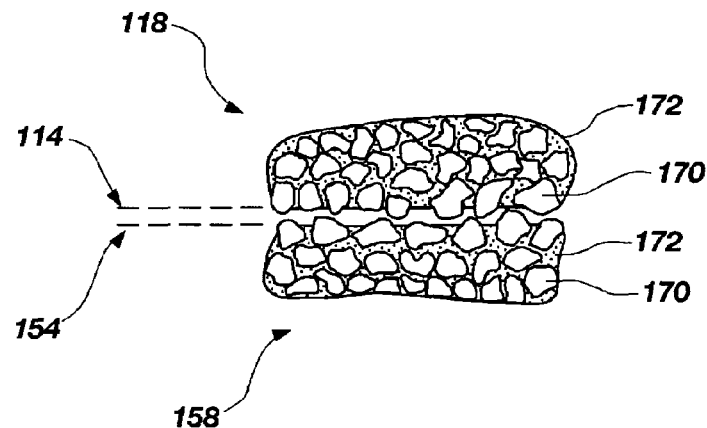
FIG. 1 shows a partial, enlarged, schematic view of conventional bearing surfaces at least partially contacting one another.
Figure 2:
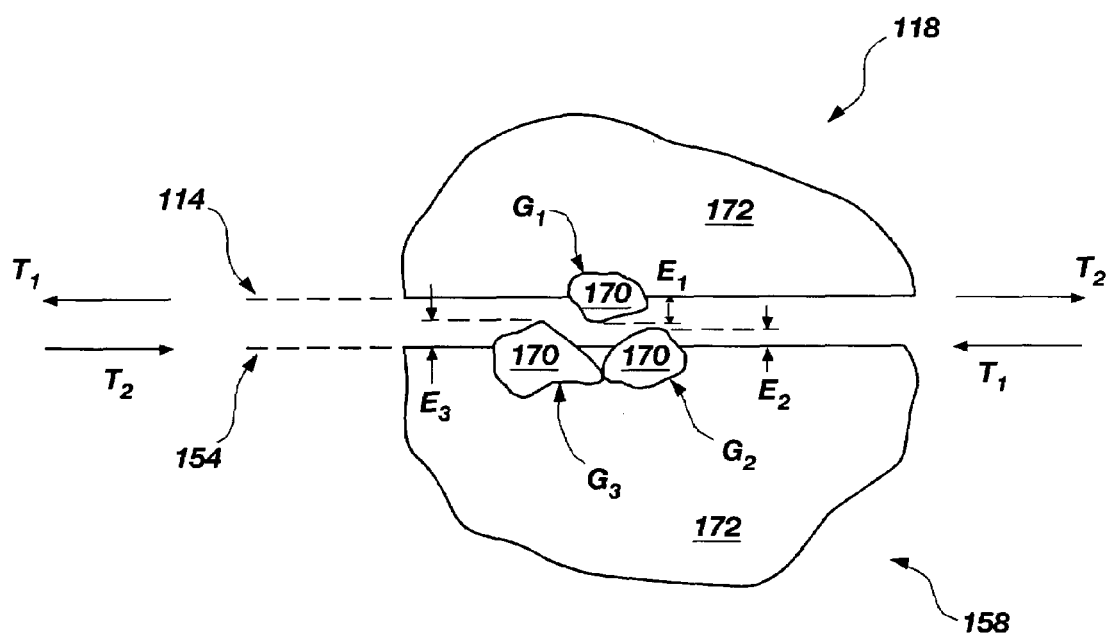
FIG. 2 shows another partial, enlarged, schematic view of the conventional bearing surfaces shown in FIG. 2.

The present invention relates generally to bearing apparatuses including bearing surfaces comprising a superhard or a superabrasive material. In one embodiment, a bearing apparatus may include polycrystalline diamond inserts or compacts defining a plurality of surfaces that move relative to one another. Such bearing apparatuses may encompass so-called thrust bearings, radial bearings, or other bearing apparatuses including bearing surfaces that move in relation to one another, without limitation.

More particularly, one aspect of the present invention relates to configuring each of the respective bearing surfaces of a rotor and a stator to inhibit mechanical locking of the "grains" of superhard material. "Grain" is a term of art that refers to particles or crystals that may comprise a superhard material. For example, as known in the art, polycrystalline diamond may be formed by a sintering process wherein diamond particles are subjected to a high-temperature, high pressure environment. During such a process, such diamond particles may initially fracture and may subsequently bond to one another. Usually, a catalyst (e.g., cobalt, nickel, iron, etc.) may be employed to facilitate bonding of the diamond particles to one another during sintering. "Grain," as used herein, refers to the bonded particles of a superhard material resulting from the sintering process. Thus, it may be appreciated that estimation of grain size of one or more grains of a superhard material may be determined by sectioning a sintered superhard material and defining adjoined "grains" of the material. Of course, some consideration may correct or account for the fact that the cross-sectional plane will not pass through the center of each of the grains that the cross-sectional plane intersects. Processes for determining grain size are known in the art and may be affected by the algorithm or method of defining of the grains (i.e., along the grain boundaries) comprising the superhard material.

The present invention relates generally to bearing apparatuses including a rotor and a stator wherein the rotor includes a plurality of bearing elements defining a bearing surface and the stator includes a plurality of bearing elements defining another bearing surface. Such bearing elements may comprise a superhard material, such as, for example, polycrystalline diamond, cubic boron nitride, tungsten carbide, silicon carbide, or combinations thereof. "Superhard," as used herein, refers to any material having a hardness that is at least equal to a hardness of tungsten carbide. The present invention contemplates that a bearing surface of a rotor or stator may be configured to inhibit mechanical locking or other detrimental interaction with a bearing surface of a stator or rotor, respectively. Thus, at least one bearing element of a rotor may comprise a first material and at least one bearing element of a stator may comprise a second material. More particularly, the first material and the second material may be structured to inhibit mechanical interlocking or other detrimental interaction between the bearing surfaces. Such superhard materials may include different grain sizes of abrasive particle, as well as superhard materials of different type or quality grades.

Figure 3:
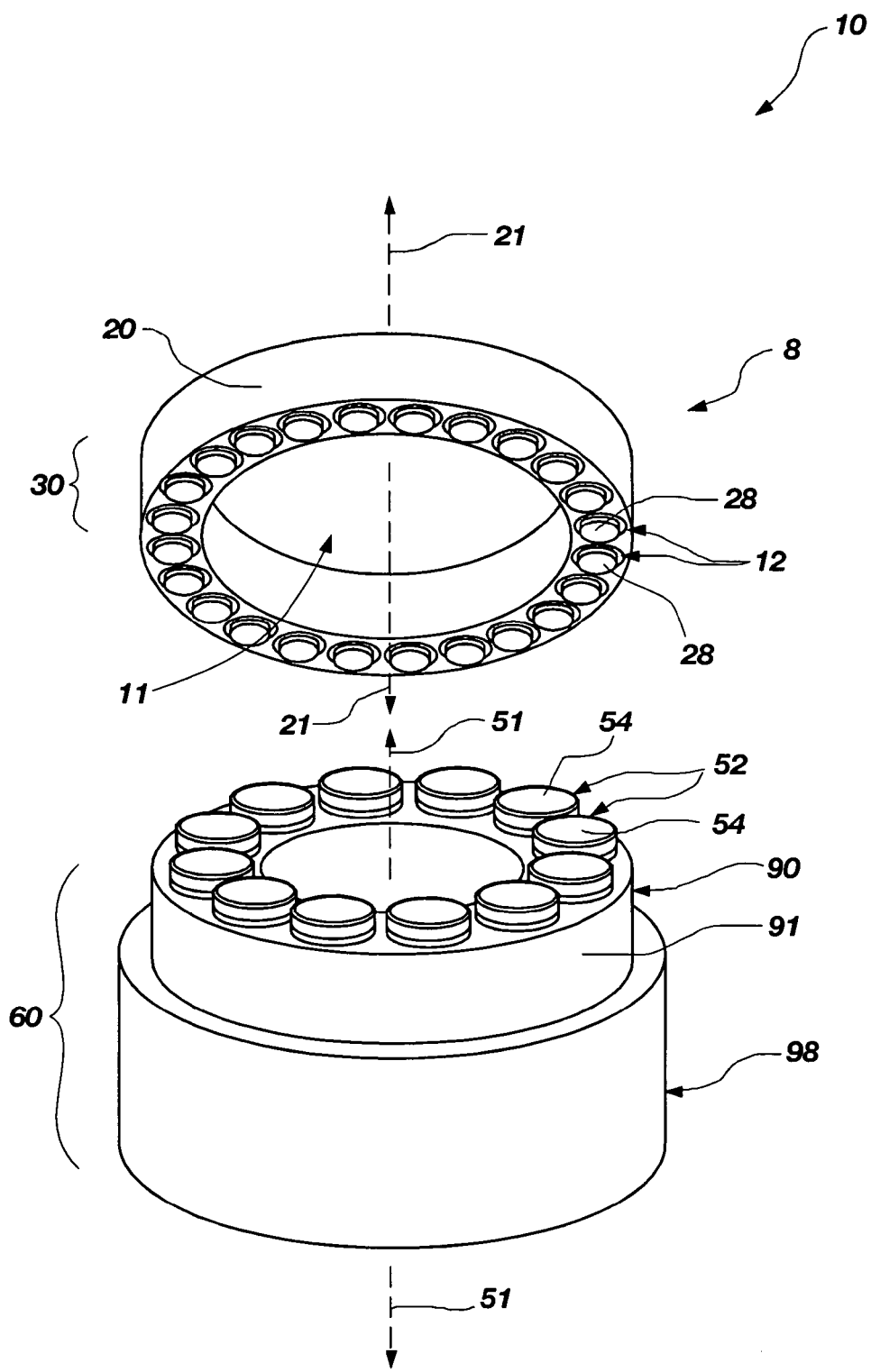
FIG. 3 shows an exploded assembly view of a thrust bearing apparatus according to the present invention.

Generally, a rotor and a stator may be used in combination with one another to form a bearing apparatus. For example, FIG. 3 shows an exploded, assembly view of a thrust bearing apparatus 10 including a stator assembly 30 and rotor assembly 60. During use, rotor assembly 60 and stator assembly 30 may be aligned with one another and the bearing surfaces 28 of bearing elements 12 may be in contact with the bearing surfaces 54 of bearing elements 52, respectively. Of course, rotor assembly 60 and stator assembly 30 may be affixed to a system to provide a thrust bearing structure. It should also be appreciated that the terms "rotor" and "stator" refer to rotating and stationary portions of a bearing apparatus, respectively, and, therefore, "rotor" and "stator" may refer to an identical component depending on whether it is configured to rotate or remain stationary, respectively. Explaining further, as shown in FIG. 3 shows a perspective view of one embodiment of a stator 8 comprising body 20, which defines a plurality of recesses configured for accepting a plurality of bearing elements 20, respectively. As shown in FIG. 3, body 20 of stator 8 may be configured in a generally ring-shaped or toroid-shaped configuration and may define an aperture 11 which is generally centered about longitudinal axis 21. Body 20 of stator 8 may comprise a high strength steel or other suitable material. FIG. 3 also shows a perspective view of rotor assembly 60 (generally centered with respect to longitudinal axis 51) including bearing elements 52, rotor 90, and rotor base 98. As shown in FIG. 3, rotor 90 may comprise a generally ring-shaped body 91 that may be coupled to rotor base 98. In addition, bearing elements 52 may be configured so that alignment and rotation of rotor assembly 60 with stator assembly 30 results in at least one bearing surface 28 of a bearing element 12 being in at least partial contact with at least one respective bearing surface 54 of bearing elements 52. Put another way, upon rotation of rotor assembly 60 a bearing surface 54 of a bearing element 52 contacts a bearing surface 28 of a bearing element 12 prior to loss of contact with a bearing surface 28 of a circumferentially preceding bearing element 12. Of course, many embodiments relating to the arrangement of bearing elements associated with a rotor and bearing elements associated with a stator are contemplated by the present invention and any configurations as known in the art may be employed within a bearing apparatus according to the present invention.

Figure 4:
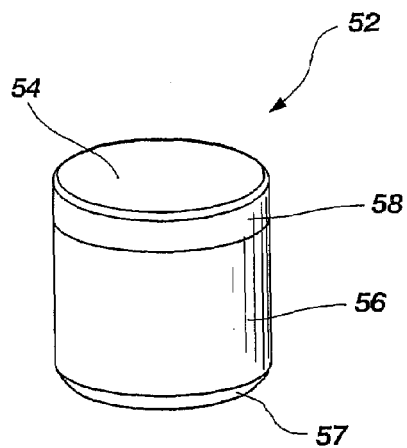
FIG. 4 shows a perspective view of a bearing element including a table comprising a superhard material.
Figure 5:
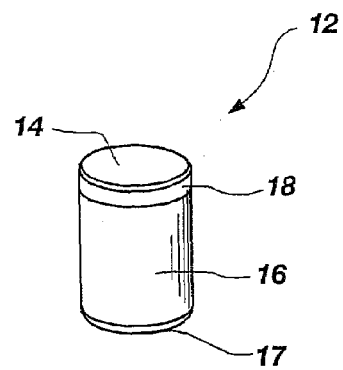
FIG. 5 shows a perspective view of a different bearing element including a table comprising a different superhard material.

FIG. 4 shows a perspective view of bearing element 52 including a table 58 bonded to a substrate 56. Table 58, as known in the art, may comprise a superhard material (e.g., polycrystalline diamond, cubic boron nitrite, or any other superhard material as known in the art). Such a configuration may provide a bearing surface 28 that is relatively wear resistant. Furthermore, table 58 includes a bearing surface 54 and may optionally include a chamfer 57. Bearing surface 54 may be substantially planar and may be configured to contact another bearing element (e.g., a bearing element coupled to a rotor) including another bearing surface that corresponds to bearing surface 58. In one embodiment, bearing element 52 may comprise a polycrystalline diamond compact ("PDC"). In such a configuration, substrate 56 may comprise a cobalt-sintered tungsten carbide and table 58 may comprise polycrystalline diamond. As known in the art, polycrystalline diamond may include a catalyst (e.g., cobalt, nickel, iron, or any other catalyst as known in the art) to facilitate formation of polycrystalline diamond. Optionally, at least a portion of such a catalyst within table 58 may be removed (e.g., by acid leaching or as otherwise known in the art) to a desired depth into the table 58 from the bearing surface 54. Of course, any methods or equipment (e.g., chemical vapor deposition, high-temperature and high pressure environments such as cubic presses or belt presses, etc.), as known in the art, for forming superhard materials may be employed for forming table 58, table 18, or both. As shown in FIG. 4, bearing element 52 may be substantially cylindrical. Similarly, FIG. 5 shows a perspective view of bearing element 12 including a table 18 bonded to a substrate 16. Table 18 may comprise a superhard material and may optionally include a chamfer 17. Bearing surface 54 may be substantially planar and may be configured to contact another bearing element (e.g., a bearing element coupled to a rotor) including another bearing surface that corresponds to bearing surface 14. In one embodiment, bearing element 52 may comprise a polycrystalline diamond compact ("PDC"), as explained above and may be substantially cylindrical.

Figure 6:
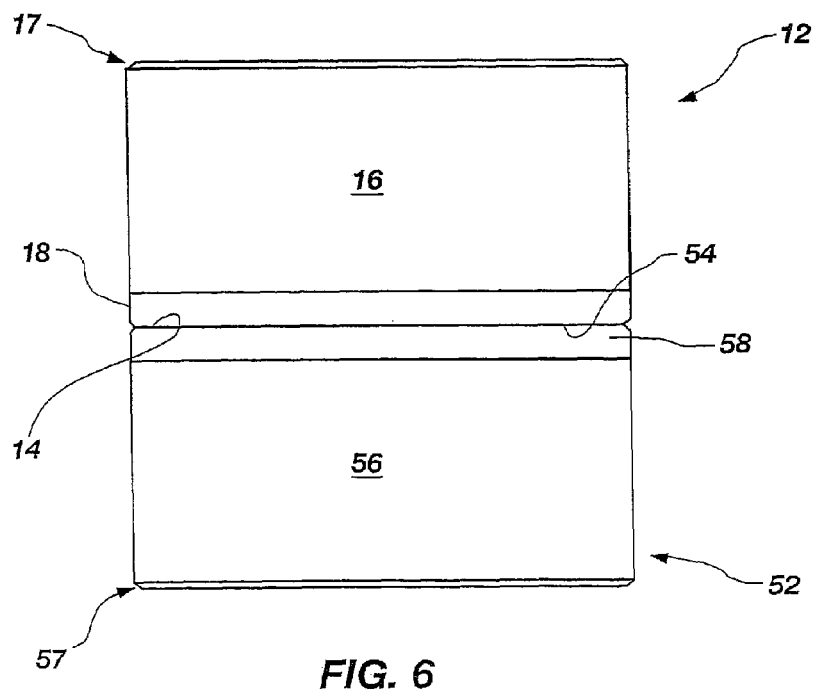
FIG. 6 shows a schematic view of the bearing elements shown in FIGS. 4 and 5 positioned so that the respective bearing surfaces of each of the bearing elements at least partially contact one another.

As known in the art, during use of a bearing apparatus, bearing surfaces of the bearing elements of the stator and bearing surfaces of the bearing elements of the rotor may be configured to contact one another. FIG. 6 shows a schematic view of a bearing element 12 and a bearing element 52 according to the present invention positioned so that the bearing surfaces 14 and 54 at least partially contact one another. Thus, it may be understood that bearing surfaces 14 and 54 may move or slide relative to one another. As known in the art, bearing surfaces 14 and 54 may be lapped or polished to reduce the coefficient of friction developed between bearing surfaces 14 and 54.

Generally, the present invention contemplates that the rotor bearing surface (i.e., the plurality of rotor bearing elements) and the stator bearing surface (i.e., the plurality of stator bearing elements) may be structured differently. Such a rotor bearing surface and a stator bearing surface may each comprise superhard material that are selected to at least partially contact and move relative to one another without substantial damage, interlocking, or engagement with one another. In one embodiment, the present invention contemplates that at least one bearing element (e.g., each of a plurality of bearing elements or one or more of a plurality of bearing elements) of either of the rotor or the stator may comprise a superhard material exhibiting an average grain size that is smaller (e.g., substantially smaller) than an average grain size of a bearing element that it contacts. Put another way, at least one of two bearing surfaces that are configured to contact one another exhibits an average diamond grain size that is smaller than an average grain size of the other bearing surface. Such a configuration may inhibit mechanical locking, interlocking, or engagement between the diamond grains of two bearing surfaces (i.e., each of a plurality of bearing elements collectively defining the bearing surfaces, respectively) that contact one another. More particularly, inclusion of smaller (e.g., substantially smaller) superhard grains comprising a bearing surface (i.e., each of a plurality of bearing elements comprising or collectively defining a bearing surface) may inhibit or reduce an amount of exposure (i.e., protrusion from a bearing surface) that is developed by such superhard grains defining the bearing surface. Thus, constructing bearing surfaces that exhibit disparate average superhard grain sizes may be advantageous because such surfaces may not develop corresponding topographies that have the ability to interlock, engage, or otherwise damage one another.

Figure 7:
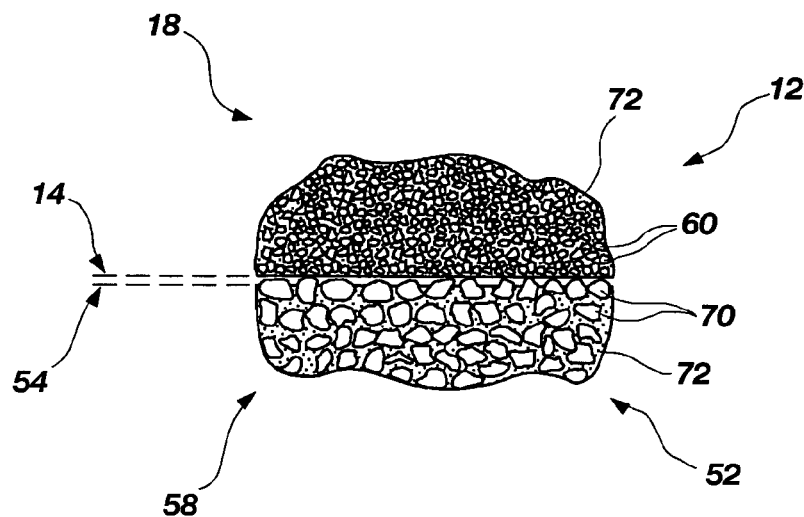
FIG. 7 shows a partial, schematic view of bearing element surfaces according to the present invention.

For example, FIG. 7 shows a partial, schematic view of the tables 18, 58 of bearing elements 12, 52, respectively, according to the present invention. Particularly, table 18 comprises superhard grains 60 (e.g., polycrystalline diamond grains, silicon carbide grains, boron nitride grains, etc.) and includes catalyst 72 (e.g., cobalt, nickel, etc.), while table 58 comprises superhard grains 70 (e.g., polycrystalline diamond grains, silicon carbide grains, boron nitride grains, etc.) and catalyst 72. As shown in FIG. 7, superhard grains 60 have an average size that is smaller than an average size of superhard grains 70. Put another way, superhard grains 60 are substantially finer than superhard grains 70. In one embodiment, superhard grains 70 may exhibit sizes ranging from about 40 microns to about 100 microns and superhard grains 60 may exhibit sizes ranging from about 2 microns to about 20 microns. Thus, average sizes of such superhard grains 60 and 70 may be within such ranges. Further, it may be appreciated that in one embodiment, an average size of superhard grains 70 may be at least twice an average size of superhard grains 60. Accordingly, the above-mentioned advantages may be exhibited by a bearing apparatus including tables 18, 58 as shown in FIG. 7. It should be appreciated that although FIG. 7 shows table 18 as including superhard grains 60, in another embodiment, table 58 may include superhard grains 60 and table 18 may include superhard grains 70, if desired. Put another way, it should be understood that either of table 18 or table 58 may be structured as table 18 is shown in FIG. 7 (and vice versa). More particularly, it may be appreciated that superhard grains 70 (i.e., a protruding or exposed portion) may be inhibited from interacting with superhard grains 60 in such a way that engages or interlocks with superhard grains 60. Thus, damage caused by superhard grains 70 protruding and at least partially interlocking or interfering with superhard grains 60 may be reduced or inhibited. On the other hand, while the protruding or exposed portions of superhard grains 60 may fit between adjacent exposed superhard grains 70, because superhard grains 60 exhibit a relatively moderate or small exposure, such interlocking or interference may be minimal and any attendant damage related to such engagement may also be minimal. For example, damage to one of superhard grains 60 or removal of one of superhard grains 60 from table 18 may be relatively minor and may have little affect on the performance of a bearing apparatus, including tables 18, 58. Therefore, one aspect of the present invention contemplates that bearing elements may be configured to inhibit interference or interlocking between the largest superhard grains comprising the bearing surface of one of the bearing elements with the largest superhard grains comprising the other bearing surface.

It should be appreciated that the present invention contemplates that superhard materials may include a plurality of different grain sizes. Put another way, a superhard material may comprise a first plurality of grains exhibiting substantially similar grain sizes (i.e., a first size) and at least a second plurality of grains exhibiting substantially similar grain sizes (i.e., a second size). Thus, in the embodiment shown in FIG. 7, table 18 may include another plurality of superhard grains that are yet smaller than superhard grains 60. In a further embodiment, table 18 may include another plurality of superhard grains that are larger than superhard grains 60.

Figure 8:
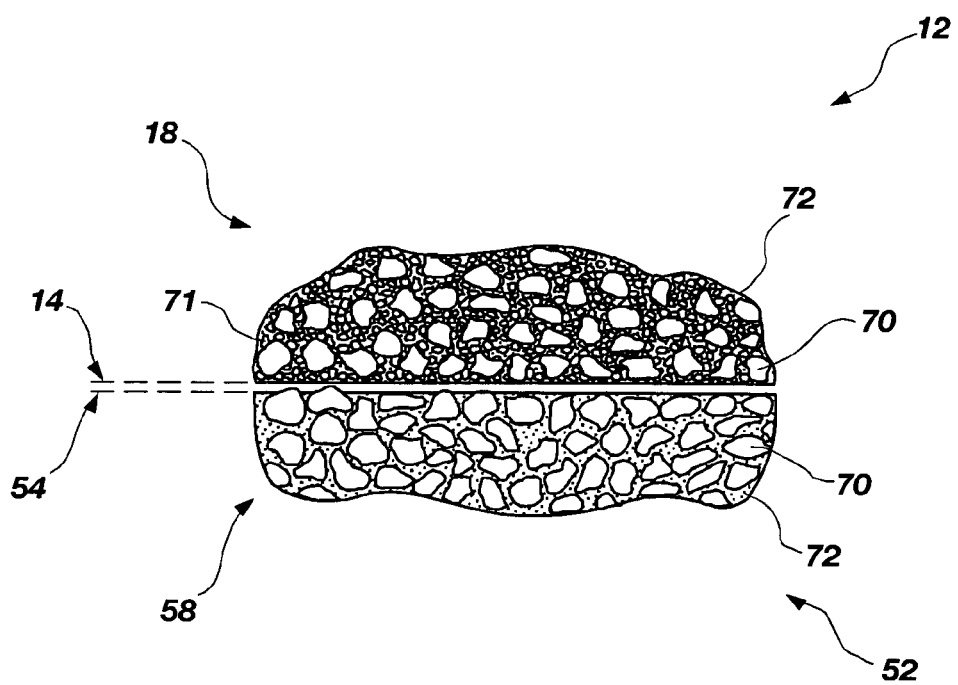
FIG. 8 shows a partial, schematic view of another embodiment of bearing surfaces according to the present invention.

Explaining further, in another aspect of the present invention, it may be advantageous to inhibit interlocking between the largest superhard grains of two bearing surfaces. In one embodiment, two bearing surfaces may each comprise largest superhard grains that are substantially equal in size, however, one of the bearing surfaces may also comprise diamond grains which are smaller than the largest superhard grains. In one embodiment, FIG. 8 shows a partial, schematic view of tables 18, 58 which form bearing surfaces 14, 54, respectively. As shown in FIG. 8, table 58 includes superhard grains 70 which are substantially surrounded by binder or catalyst 72. In one exemplary embodiment, superhard grains 70 may have a average size of about 40 microns to about 100 microns. Further, as shown in FIG. 8, table 18 may comprise superhard grains 70 and superhard grains 71, wherein superhard grains 71 exhibit an average size that is smaller than an average size of superhard grains 70. More specifically, superhard grains 71 may exhibit a average size of about 2 microns to about 20 microns, while, as mentioned above, superhard grains 70 may exhibit a nominal size of about 40 microns to about 100 microns. Accordingly, in one aspect of the present invention, superhard grains 70 may exhibit a average size that is at least twice the magnitude of the average size of superhard grains 71. Thus, as explained above, such a configuration may inhibit interlocking of the superhard grains 70 of table 58 with the superhard grains 70 of table 18. Accordingly, it may be appreciated that inhibiting interlocking between the largest grains comprising two bearing surfaces may prevent or limit damage resulting from relative movement of such bearing surfaces while in contact with one another.

Figure 9:
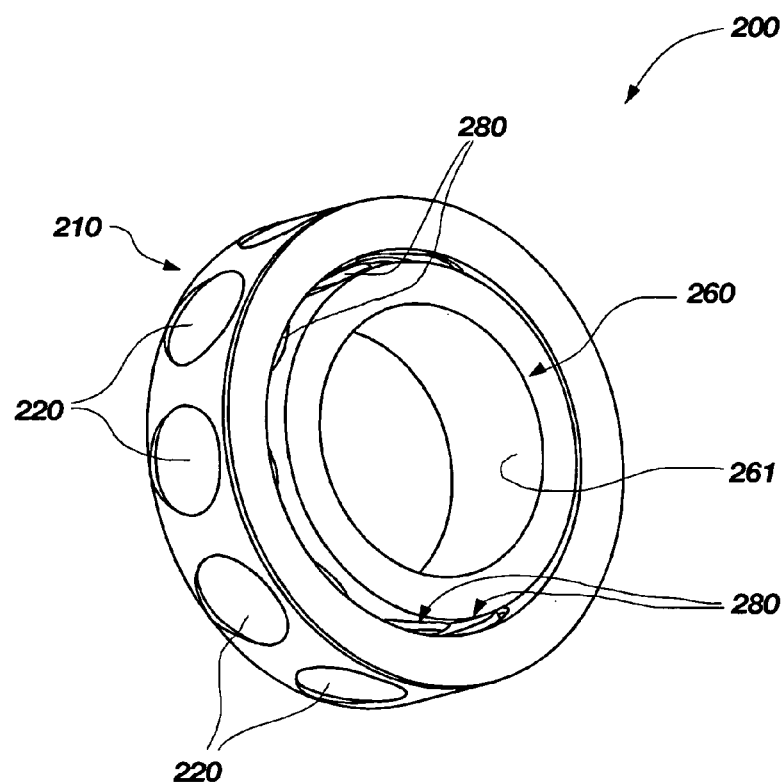
FIG. 9 shows a perspective view of a radial bearing apparatus according to the present invention.
Figure 10:
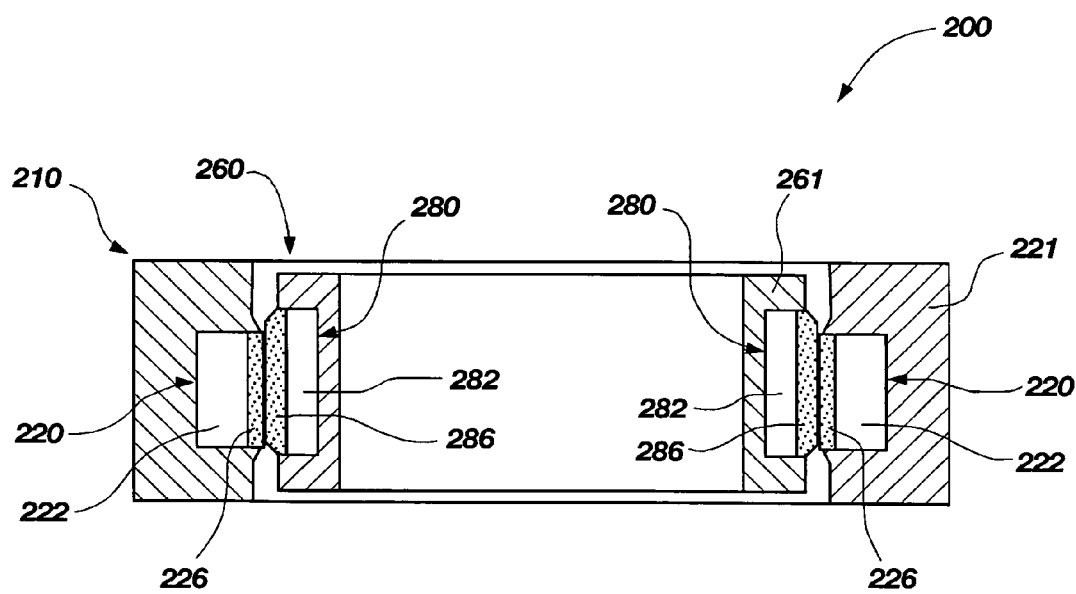
FIG. 10 shows a side, cross-sectional view of the radial bearing apparatus shown in FIG. 9.

The present invention further contemplates that disparately or differently structured bearing surfaces may be employed within radial bearing apparatuses. For example, such bearing apparatuses may include a first plurality of bearing elements collectively defining a first bearing surface (e.g., an arcuately shaped bearing surface) and a second plurality of bearing elements collectively defining a second bearing surface (a correspondingly arcuately shaped bearing surface). For example, FIGS. 9 and 10 show a perspective view and a side cross-sectional view of a radial bearing apparatus 200 including inner race 260 positioned generally within outer race 210. More particularly, inner race 260 may include a plurality of bearing elements 280 (each comprising a substrate 282 and a table 286 comprising a superhard material) coupled to the inner race 260 and outer race 210 may include a plurality of bearing elements 220 (each comprising a substrate 222 and a table 226 comprising a superhard table) coupled to the outer race 210. For instance, each of the plurality of bearing elements 280 may be adhesively bonded, brazed, welded, fastened, or otherwise affixed to the body 261 of inner race 260 as known in the art. Similarly, each of the plurality of bearing elements 220 may be adhesively bonded, brazed, welded, fastened, or otherwise affixed to the body 221 of outer race 210 as known in the art. Thus, inner race 260 and outer race 210 may be configured so that the bearing surfaces (collectively defined by the plurality of bearing elements 280 and the plurality of bearing elements 220) may at least partially contact one another. Further, according to one aspect of the present invention, at least one of the bearing surfaces of bearing elements 220 and at least one of the bearing surfaces of bearing elements 280 may be structured differently from one another. It should be understood (as explained above with respect to the terms "rotor" and "stator") that inner race 260 and outer race 210 may be described as a rotor and a stator, or vice versa, depending on how the inner race 260 and the outer race 210 are configured to move relative to one another.

Figure 11:
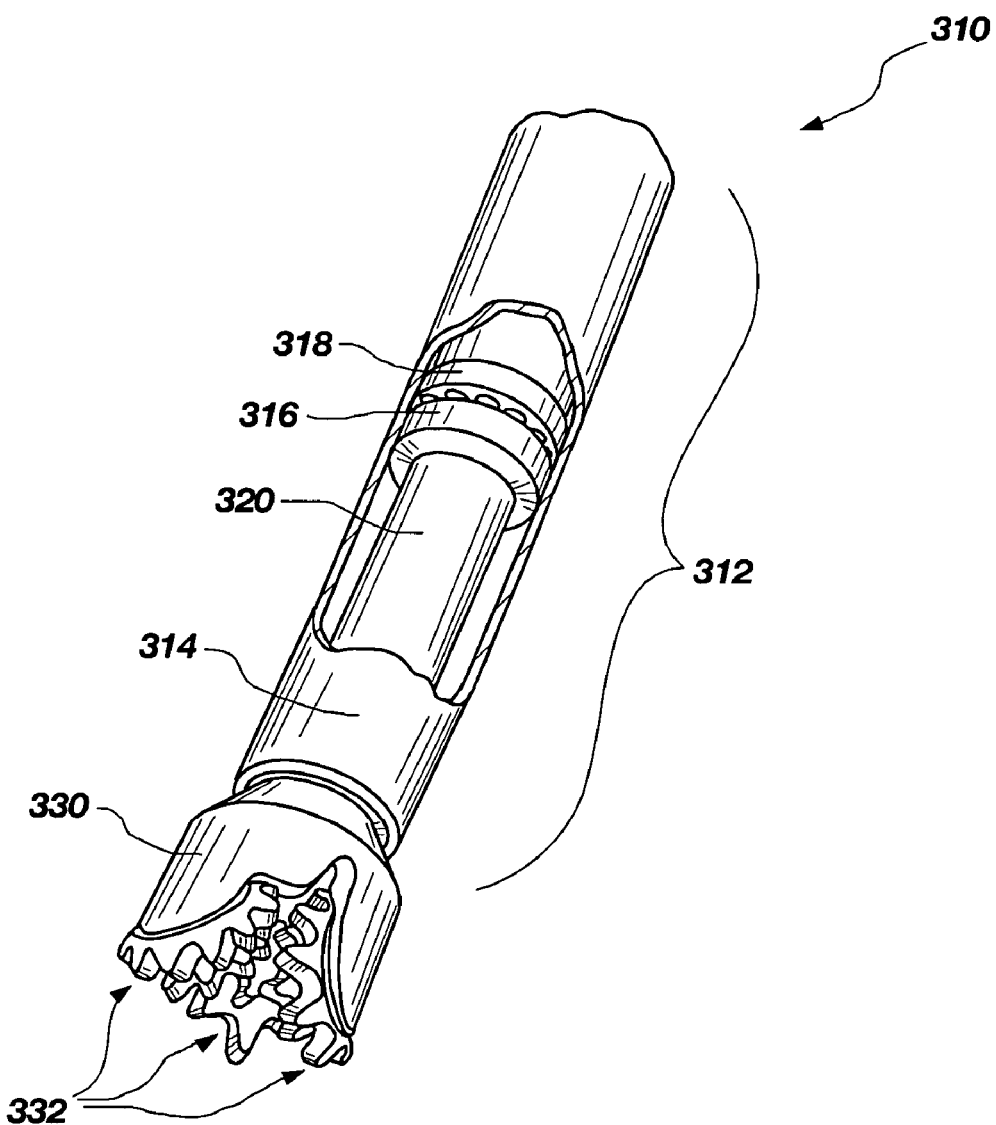
FIG. 11 shows a perspective view of a subterranean drilling system incorporating a thrust bearing apparatus according to the present invention.

As mentioned above, the bearing apparatuses including bearing surfaces encompassed by the present invention may be incorporated into a mechanical system. For example, such thrust bearing structures may be employed in subterranean drilling systems, such as, for instance, mud motors or other down hole assemblies. For example, FIG. 11 shows a perspective view of a subterranean drilling system 310 incorporating a thrust bearing apparatus according to the present invention. In particular, as known in the art, a rotary drill bit 330 may be rotated by downhole drilling motor assembly 312. Downhole drilling motor assembly 312 may be located at the end of a series of pipe sections comprising a drill string. The housing 314 of downhole drilling motor assembly 312 remains stationary as rotary drill bit 330 rotates. In further detail, output shaft 320 of downhole drilling motor assembly 312 may be coupled to rotary drill bit 330 and drilling fluid (i.e., drilling mud) may cause torque to be applied to the output shaft 320 and to rotary drill bit 330. Rotary drill bit 330 is shown as a so-called "roller cone" type bit including roller cones 332, but may be a fixed cutter (e.g., a drill bit including polycrystalline diamond cutting elements or compacts) or any other rotary drill bit or drilling tool (e.g., a reamer, reamer wing, impregnated diamond drill bit, core bit, etc.) as known in the art, without limitation. As shown in FIG. 11, a rotor 316 and a stator 318 (i.e., a thrust bearing apparatus) may be operably assembled to downhole drilling motor assembly 312, as known in the art. U.S. Pat. Nos. 4,410,054, 4,560,014, 5,092,687, 5,364,192, 5,368,398, and 5,480,233, the disclosure of each of which is incorporated herein, in its entirety, by this reference, disclose exemplary subterranean drilling systems within which thrust bearing apparatuses including bearing surfaces according to the present invention may be incorporated. In addition, radial bearing apparatuses including bearing surfaces encompassed by the present invention may be included within a mechanical system. In one example, so-called "roller cone" rotary drill bits may benefit from a radial bearing apparatus contemplated by the present invention. More specifically, it may be appreciated that an inner race may be mounted or affixed to a spindle of a roller cone and an outer race may be affixed to an inner bore formed within a cone and that such an outer race and inner race may be assembled to form a radial bearing apparatus. One embodiment of a roller cone rotary drill bit including a conventional radial bearing is disclosed in U.S. Pat. No. 4,738,322 to Hall, et al., the disclosure of which is incorporated herein, in its entirety, by this reference.

Although bearing apparatuses and systems described above have been discussed in the context of subterranean drilling equipment and applications, it should be understood that such bearing apparatuses and systems are not limited to such use and could be used for varied applications as known in the art, without limitation. Thus, such bearing apparatuses and systems are not limited to use with subterranean drilling systems and may be used in the context of any mechanical system including a bearing apparatus. In addition, while certain embodiments and details have been included herein for purposes of illustrating aspects of the instant disclosure, it will be apparent to those skilled in the art that various changes in the systems, apparatuses, and methods disclosed herein may be made without departing from the scope of the instant disclosure, which is defined, in part, in the appended claims. The words "including" and "having," as used herein including the claims, shall have the same meaning as the word "comprising."

What is claimed is:

1. A bearing apparatus comprising:
a rotor;
a plurality of rotor bearing elements mounted to the rotor, the plurality of rotor bearing elements defining a rotor bearing surface, the rotor bearing surface comprising a first superhard material;
a stator;
a plurality of stator bearing elements mounted to the stator, the plurality of stator bearing elements defining a stator bearing surface, each stator bearing surface comprising a second superhard material;
wherein the second superhard material exhibits an average grain size that is at least approximately twice as large as an average grain size of the first superhard material.

2. The bearing apparatus of claim 1, wherein:
the average grain size of the first superhard material is between about 2 microns to about 20 microns;
the average grain size of the second superhard material is between about 40 microns to about 100 microns.

3. The bearing apparatus of claim 1, wherein the first superhard material comprises a first plurality of superhard grains exhibiting generally equal sizes and a second plurality of superhard grains exhibiting generally equal sizes.

4. The bearing apparatus of claim 1, wherein each of the plurality of stator bearing elements and each of the plurality of rotor bearing elements comprise polycrystalline diamond.

5. The bearing apparatus of claim 1, wherein each of the plurality of stator bearing elements and each of the plurality of rotor bearing elements comprise a polycrystalline diamond table formed on a cemented tungsten carbide substrate.

6. The bearing apparatus of claim 1, wherein:
the rotor and the stator comprise substantially ring-shaped bodies, respectively;
the rotor includes a plurality of recesses configured to mount the plurality of rotor bearing elements, respectively, to the rotor; and
the stator includes a plurality of recesses configured to mount the plurality of stator bearing elements, respectively, to the stator.

7. The bearing apparatus of claim 6, wherein the rotor and stator are configured to collectively form a thrust bearing apparatus.

8. The bearing apparatus of claim 6, wherein the rotor and stator are configured to collectively form a radial bearing apparatus.

9. The bearing apparatus of claim 1, wherein the first superhard material and the second superhard material comprise a material selected from the group comprising polycrystalline diamond, diamond formed by chemical vapor deposition, silicon carbide, boron nitride, and tungsten carbide.

10. The bearing apparatus of claim 1, wherein the rotor bearing surface is substantially planar and the stator bearing surface is substantially planar.

11. The bearing apparatus of claim 1, wherein the rotor bearing surface is arcuate and the stator bearing surface is correspondingly arcuate.

12. The bearing apparatus of claim 11, wherein the rotor bearing surface is substantially cylindrical and the stator bearing surface is substantially cylindrical.

13. A method of operating a bearing apparatus, the method comprising:
providing a rotor bearing surface comprising a plurality of rotor bearing elements, the rotor bearing elements comprising a first superhard material;
providing a stator bearing surface comprising a plurality of stator bearing elements, the stator bearing elements comprising a second superhard material;
wherein the second superhard material exhibits an average grain size that is at least approximately twice as large as an average grain size of the first superhard material;
abutting at least a portion of the rotor bearing surface against at least a portion of the stator bearing surface; and
moving the rotor bearing surface relative to the stator bearing surface.

14. The method of claim 13, wherein:
providing the stator bearing surface comprises providing a stator including the plurality of stator bearing elements each comprising a polycrystalline diamond table formed on a cemented tungsten carbide substrate;
providing the rotor bearing surface comprises providing a rotor including the plurality of rotor bearing elements each comprising a polycrystalline diamond table formed on a cemented tungsten carbide substrate.

15. The method of claim 13, wherein moving the rotor bearing surface relative to the stator bearing surface comprises inhibiting interlocking of a topography of the rotor bearing surface with a topography of the stator bearing surface.

16. The method of claim 13, wherein moving the rotor bearing surface relative to the stator bearing surface occurs without substantial interlocking between a plurality of superhard grains comprising the bearing surface of the stator and a plurality of superhard grains comprising the bearing surface of the rotor.

17. A bearing apparatus comprising:
a rotor;
at least one rotor bearing element mounted to the rotor, the at least one rotor bearing element defining a rotor bearing surface, the rotor bearing surface comprising a first superhard material;
a stator;
at least one stator bearing element mounted to the stator, the at least one stator bearing element defining a stator bearing surface, the stator bearing surface comprising a second superhard material;
wherein the second superhard material exhibits an average grain size that is at least approximately twice as large as an average grain size of the first superhard material.

18. A motor assembly for use in drilling subterranean formations, the motor assembly comprising:
a motor configured to apply a torque to a rotary drill bit, the motor operably coupled to a thrust bearing apparatus;
wherein the thrust bearing apparatus comprises:
a rotor;
a plurality of rotor bearing elements mounted to the rotor, the plurality of rotor bearing elements defining a rotor bearing surface comprising a first superhard material;
a stator;

a plurality of stator bearing elements mounted to the stator, the plurality of stator bearing elements defining a stator bearing surface comprising a second superhard material;

wherein the second superhard material exhibits an average grain size that is at least approximately twice as large as an average grain size of the first superhard material.

19. The motor assembly of claim 18, wherein:

the average grain size of the first superhard material is between about 2 microns to about 20 microns;

the average grain size of the second superhard material is between about 40 microns to about 100 microns.

20. The motor assembly of claim 18, wherein:

the first superhard material comprises a first plurality of superhard grains exhibiting generally equal sizes and a second plurality of superhard grains exhibiting generally equal sizes.

21. The motor assembly of claim 18, wherein each of the plurality of stator bearing elements and each of the plurality of rotor bearing elements comprise polycrystalline diamond.

22. The motor assembly of claim 18, wherein each of the plurality of stator bearing elements and each of the plurality of rotor bearing elements comprise a polycrystalline diamond table formed on a cemented tungsten carbide substrate.

23. The motor assembly of claim 18, wherein the rotor bearing surface is substantially planar and the stator bearing surface is substantially planar.

24. The motor assembly of claim 18, wherein:

the rotor and the stator comprise substantially ring-shaped bodies, respectively;

the rotor includes a plurality of recesses configured to mount the plurality of rotor bearing elements, respectively, to the rotor;

the stator includes a plurality of recesses configured to mount the plurality of stator bearing elements, respectively, to the stator.

25. The motor assembly of claim 18, wherein the first superhard material and the second superhard material comprise a material selected from the group comprising polycrystalline diamond, diamond formed by chemical vapor deposition, silicon carbide, boron nitride, and tungsten carbide.

* * * * *